No. 681,759. Patented Sept. 3, 1901.
A. VANDANDAIGUE.
TIRE TIGHTENER.
(Application filed Mar. 6, 1901.)
(No Model.)

Witnesses
A. Vandandaigue, Inventor.
By C. A. Snow & Co.
Attorneys

UNITED STATES PATENT OFFICE.

ANDREW VANDANDAIGUE, OF WILLOWSPRINGS, MISSOURI.

TIRE-TIGHTENER.

SPECIFICATION forming part of Letters Patent No. 681,759, dated September 3, 1901.

Application filed March 6, 1901. Serial No. 50,092. (No model.)

*To all whom it may concern:*

Be it known that I, ANDREW VANDAN-DAIGUE, a citizen of the United States, residing at Willowsprings, in the county of Howell and State of Missouri, have invented a new and useful Tire-Tightener, of which the following is a specification.

This invention relates to tire-tighteners for vehicle-wheels, and has for its object to provide an improved adjustable connection between a spoke and the rim of a wheel, so as to force the rim outwardly to tighten the tire whenever it may become loose.

It is furthermore designed to provide such a device as may be applied to any ordinary wheel without materially altering the same and also to maintain a strong and durable connection between the spoke and the rim, so as to withstand the heavy jars that are received by the spoke at its connection with the rim.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

Figure 1:
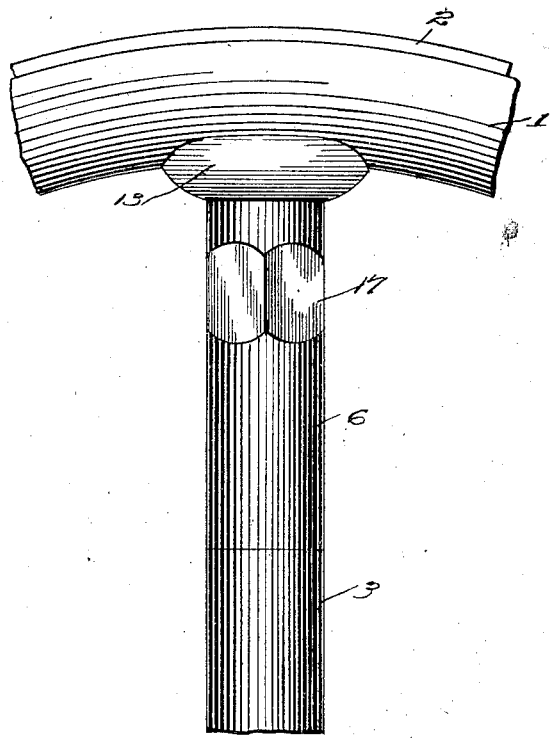
Figure 2:
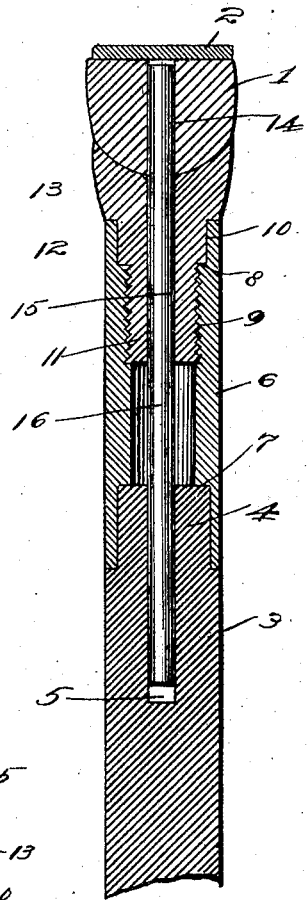
Figure 3:
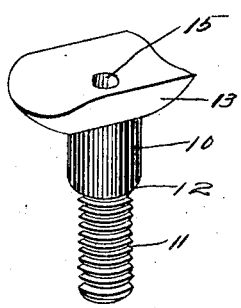

In the drawings, Figure 1 is a side elevation of a portion of a spoke connected to the adjacent portion of a rim by means of the present invention. Fig. 2 is a central longitudinal sectional view thereof, taken transversely of the rim. Fig. 3 is a detail perspective view of the rim-engaging part of the device.

Like characters of reference designate corresponding parts in all of the figures of the drawings.

Referring to the drawings, 1 designates a portion of a wheel-rim having the usual tire 2 and a spoke 3, which is connected to the inner side of the rim by means of the present device. It will be understood that these parts are common or ordinary and have been shown to more adequately illustrate the application and operation of the tire-tightener.

In carrying out the invention the spoke is cut off or terminated at a suitable distance from the rim and provided with a slightly-reduced tenon 4 (shown in Fig. 1 of the drawings) and of cylindrical form. A longitudinal socket or opening 5 is bored or otherwise formed in the outer or tenon end of the spoke.

The connection between the shortened spoke and the rim is had by means of a rotatable sleeve or tube 6, the intermediate portion of which is thickened inwardly, so as to form the opposite internal marginal shoulders 7 and 8, located at suitable distances from the respective ends of the coupling-sleeve and forming opposite terminal interiorly-smooth sockets, the tenon 4 being received within the inner socket and against the shoulder 7, thereby forming a swiveled connection between the coupling and the spoke for the purpose of permitting of an independent rotation of the coupling upon the spoke. The intermediate internal portion of the coupling is screw-threaded, as at 9, beginning at the outer shoulder 8 and extending inwardly for a suitable distance.

Between the outer end of the coupling and the rim there is a cylindrical stem 10, which fits within the socket at the outer end of the coupling and has a reduced externally-screw-threaded extremity 11 to engage the screw-threaded interior of the intermediate portion of the coupling and the marginal shoulder 12, formed by the reduced extremity of the stem, normally resting against the marginal shoulder 8 of the coupling. At the opposite outer end of the stem there is provided an enlarged base 13, which is concaved upon its outer side, so as to snugly fit the convex inner side of the rim, whereby the stem is prevented from being turned upon the rim. An opening 14 is formed transversely through the rim, so as to register with the longitudinal bore 15 of the stem, and a pin or rod 16 is passed inwardly through the opening in the rim, the bore of the stem, the interior of the coupling, and into the socket in the outer end of the spoke, whereby the connection between the spoke and the rim is braced and strengthened, so as to form a rigid connection and obviate any weakness there may be in the connection between the parts of the device. It will be understood that the pin or rod is inserted from the outer side of the wheel and prior to the application of the tire, whereby the latter prevents the rod from working outwardly from the spoke. Moreover, it is designed to drive the pin tightly in place, so as to form a rigid connection between the rim, the stem, and the spoke, the interior of the coupling being larger than the diameter of the pin, so as not to bind thereon.

From the foregoing description it will be apparent that by turning the coupling 6 in the proper direction upon its swiveled connection with the spoke the stem is fed or forced longitudinally outward, thereby pressing against the rim and forcing the same outwardly into snug engagement with the tire, whereby the latter is effectually tightened. For convenience in turning the coupling a portion of the exterior thereof is made angular, as at 17, for engagement by an ordinary wrench. However, a pipe-wrench may be applied to the cylindrical portion thereof, if desired.

What is claimed is—

1. The combination with a rim, and a spoke, which is terminated short of the rim and provided with a longitudinal central socket in its outer end, the rim having a corresponding transverse opening formed therein, of a non-rotatable screw-threaded stem projected radially inward from the rim, and provided with a longitudinal bore corresponding to the opening in the rim, a tubular rotatable coupling having its inner end swiveled upon the outer end of the spoke, and its opposite internal portion screw-threaded and receiving the stem, and a pin or rod fitted snugly through the opening in the rim, the bore of the stem and into the socket in the spoke, the internal diameter of the coupling being larger than the external diameter of the pin or rod.

2. A spoke-and-rim connection, consisting of a rotatable tubular coupling, having one internal end portion formed into a seat for the swiveled reception of the outer end of a spoke, and its opposite end portion internally screw-threaded, a non-rotatable screw-threaded stem fitted into the internally-screw-threaded end of the coupling, and provided at its outer end with a rim-engaging base, there being a longitudinal bore formed through the stem, and a pin or rod fitting snugly the bore of the stem and projected in opposite directions at the outer end of the coupling and at the outer end of the stem, the internal diameter of the coupling being greater than the external diameter of the rod or pin.

3. A spoke-and-rim connection, consisting of a rotatable cylindrical coupling, having opposite internal marginal shoulders, the respective terminal internal portions between the shoulders and the adjacent ends of the coupling forming smooth cylindrical sockets, the intermediate portion of the coupling being inwardly thickened to form the shoulders and internally screw-threaded, a non-rotatable cylindrical stem fitting one of the socketed ends of the coupling, and having a reduced screw-threaded extremity fitted to the screw-threaded portion of the coupling, there being a longitudinal bore formed through the stem, and a rim-engaging base at the outer end of the stem, and having a recessed outer face for the reception of a rim, and a rod or pin driven through the bore of the stem and projected outwardly in opposite directions at the outer ends of the coupling and the stem, respectively.

In testimony that I claim the foregoing as my own I have hereto affixed my signature in the presence of two witnesses.

ANDREW VANDANDAIGUE.

Witnesses:
R. L. VAN HOESEN,
GEORGE A. GODSY.